Jan. 7, 1969 G. T. DOWNEY 3,420,266
COMBINATION MAGNETIC BYPASS VALVE AND INDICATOR
Filed Sept. 20, 1963 Sheet 1 of 4
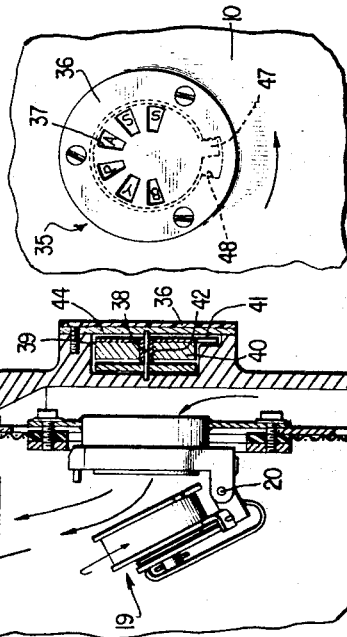
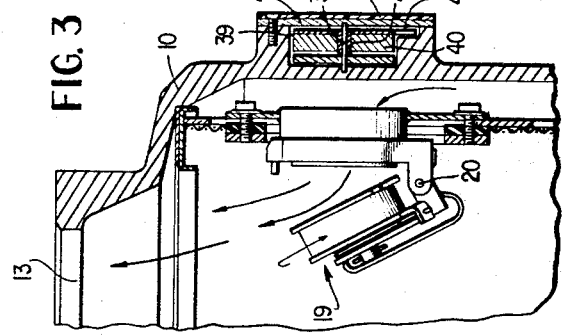
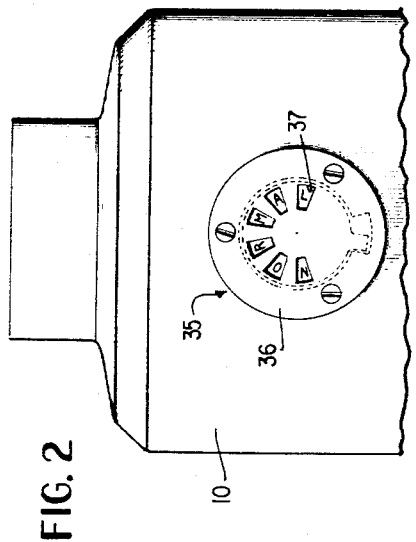
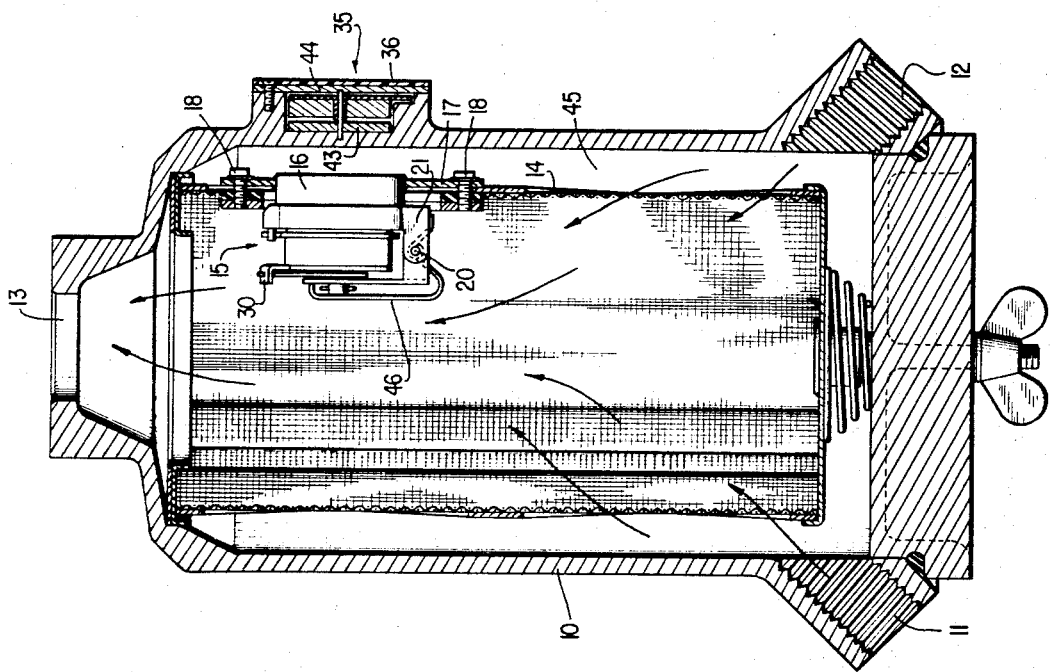
INVENTOR.
GEORGE T. DOWNEY
BY
Diggins, O'Boyle & Harmon
ATTORNEYS.

INVENTOR.
GEORGE T. DOWNEY

ATTORNEYS.

INVENTOR.
GEORGE T. DOWNEY
BY
*Diggins, O'Boyle, & Harmon*
ATTORNEYS.

INVENTOR.
GEORGE T. DOWNEY
BY
ATTORNEY

United States Patent Office 3,420,266
Patented Jan. 7, 1969

3,420,266
COMBINATION MAGNETIC BYPASS VALVE AND INDICATOR
George T. Downey, Corry, Pa., assignor to Aero-Flow Dynamics, Inc., Corry, Pa.
Filed Sept. 20, 1963, Ser. No. 310,239
U.S. Cl. 137—553                    2 Claims
Int. Cl. F16k *37/00*

This invention relates generally to fluid valves and is specifically directed to improvement in a pressure responsive combination valve and valve condition indicator.

The primary object of the invention is to provide an improved combination fluid by-pass valve and condition indicator therefor for use in fluid flow equipment including filters.

A specific object of the invention is to provide a pressure responsive by-pass valve in a fluid line which is normally held closed by a magnet mounted thereon in combination with visual valve condition indicator located closely adjacent the valve and having a permanent magnet forming a part thereof, the relationship between the magnets being such that the indicator will be moved from one position to another when the valve is opened.

A further object of the invention is to provide a pressure responsive by-pass valve in a fluid line in combination with an associated valve condition indicator, with both the valve and the indicator including functionally related permanent magnets, whereby movement of the valve from a closed to an open position will be transmitted through the magnets to move the visual indicator accordingly.

A still further object of this invention is to provide a combination pressure responsive by-pass valve and visual indicator for a fluid filter, with both the valve and the indicator including functionally related permanent magnets, whereby movement of the valve from a closed to an open position indicating a clogged filter condition will be automatically transmitted through the magnets to move the visual indicator accordingly, and whereby means is provided to prevent return of the visual indicator to its original setting except through a manual resetting operation.

Another object of this invention is to provide a visual valve condition indicator controlled in operation by a magnet associated therewith in combination with a valve of either the rotary or reciprocating type and having a magnet associated therewith, the valve associated magnet cooperating with the indicator magnet to indicate a condition of the valve.

Another object of this invention is to provide a pressure responsive by-pass valve in a fluid line in combination with an associated valve condition indicator, with both the valve and the indicator including functionally related permanent magnets, the sensitivity of the valve and its function with the related indicator being controlled by a stop means of predetermined effectiveness.

With the foregoing and other objects in view, the invention resides in the following specification and appended claims, certain embodiments and details of construction of which are illustrated in the accompanying drawings in which:

FIGURE 1 is a sectional view in elevation of a typical fluid filter to which the invention has been applied;

FIG. 2 is a fragmentary view of the filter of FIGURE 1 illustrating the visual indicator of this invention;

FIG. 3 is a fragmentary, partially sectioned view of the filter of FIGURE 1 illustrating the by-pass valve of the invention in an open position;

FIG. 4 is a view of the visual indicator of FIG. 2 illustrating a change in signal corresponding to the valve open condition of FIG. 3;

Figure 5:
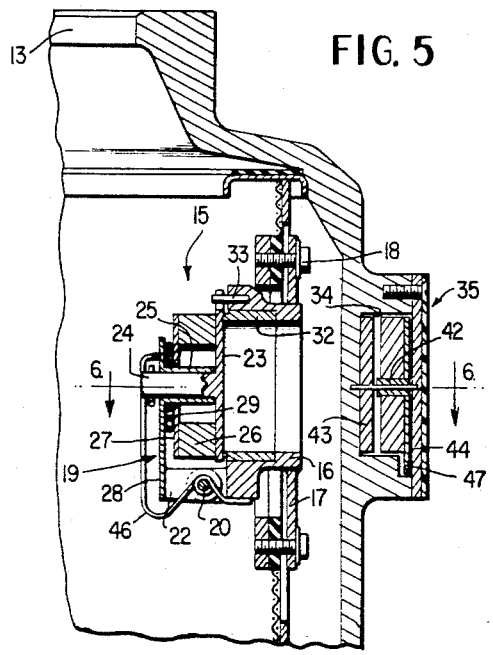
FIG. 5 is an enlarged, sectioned view of the combination magnetic valve and indicator comprising the invention as applied to the filter of FIGURE 1 shown in fragmentary form.
Figure 8:
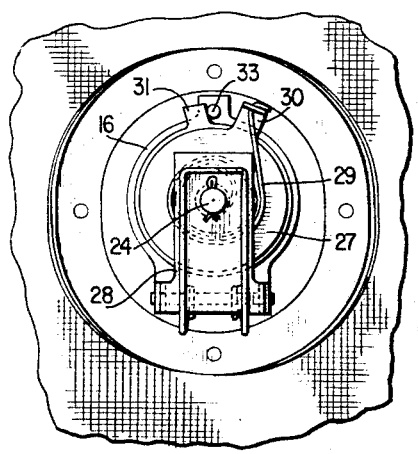
FIG. 8 is a detail rear view of the by-pass valve illustrating the cocked position of the operating magnet forming a part of the valve.
Figure 6:
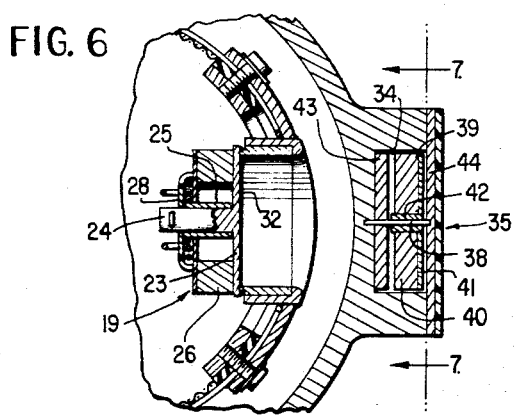
FIG. 6 is sectioned view taken along the line 6—6 of FIG. 5.

Referring particularly to FIGURE 1 a filter casing 10 is illustrated having inlet ports 11 and 12 and an outlet port 13. Within the casing 10 is a filter cartridge 14. In FIGURE 1 the solid arrows indicate the normal flow of fluid from the inlets to the outlet through the filter material of the cartridge. Under normal fluid system operation, such as an aircraft fuel system, it is desirable to provide a by-pass means to avoid interruption in feed due to a clogged filter condition. In the present invention a by-pass valve assembly, generally indicated at 15 is mounted directly in one wall of cartridge 14. The valve assembly 15 includes a sea portion 16 carried by a mounting plate 17 which is secured by bolts 18 to the cartridge as shown. The valve assembly 15 further includes a swinging valve generally indicated at 19 pivotally attached to the seat portion 16 by pivot pin 20. As shown, the pin 20 is journalled in the extending spaced arms 21 and 22 of the seat portion 16. The valve 19 carries a disc 23 which is provided with an integral rearwardly extending stub axle 24. The axle 24 is journalled freely in a tubular sleeve 25 forming a part of the valve 19. Affixed by any suitable means such as brazing to the rear of disc 23 is a circular permanent magnet 26 having the usual north and south poles. On the rear surface of magnet 26 is attached by suitable means, such as brazing, a plate member 27. Between the plate 27 and a mounting plate 28 of the valve 19 is positioned a torsion spring 29. Spring 29 is affixed as by welding at its interior terminus to the exterior of sleeve 25 and to a lip 30 of plate 27 at its outer terminus. Valve disc 23 is provided with an outwardly extending lip 31 for a purpose to be described.

The valve seat 16 includes a seating ring 32 of magnetic material against which disc 23 will seat to block flow through the valve under normal pressure conditions in the filter. The seat 16 is further provided with an outwardly extending pin 33 which, under a valve set and closed condition, cooperates with lip 31 on disc 23 to prevent rotation of the disc 23 under the influence of spring 29.

Positioned over a chamber 34 in casing 10 is a visual indicator generally indicated at 35. As illustrated in FIGS. 2 and 4, the face plate 36 of indicator 35 is provided with a series of windows 37 through which the words "by-pass" or "normal" or other indicative terms may be read. To the rear of the face plate 36 is a supporting pin 38 for a magnet and indicator unit 39. The pin 38 is fixedly supported at either end and the unit 39 is freely, rotatably mounted thereon through the medium of bushing 42. The indicator unit includes a permanent magnet 40 to the face of which is affixed an indicator plate 41 carrying the words "by-pass" or "normal" or like terms to agree in spacing with the windows 37 on face plate 36. A plate 43 is positioned at the inner end of chamber 34 for supporting pin 38. A second plate 44 carries the forward end of pin 38 and is cut away (not shown) in the area of the words "by-pass" and "normal" to permit visual indication of the indicator plate 41 through the windows 37.

Figure 9:
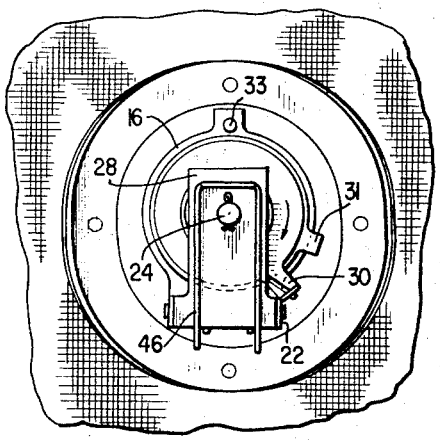
FIG. 9 is a view similar to FIG. 8, but illustrating the operating magnet in the tripped position corresponding to a valve open condition.
Figure 7:
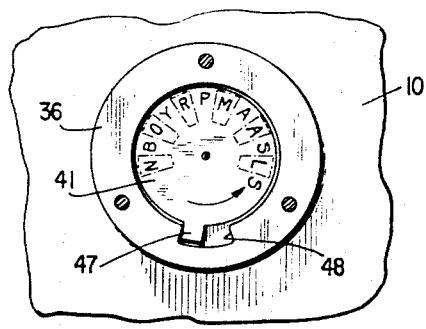
FIG. 7 is a front view of the visual indicator taken along the line 7—7 of FIG. 6.

In operation, a new or clean cartridge 14 is inserted in the casing 10 with the valve assembly 15 positioned in axial alignment with indicator 35. After a period of use, should the cartridge become clogged, then the chamber area 45 between the cartridge and the casing will experience a considerable rise in pressure, due to pressure in the system to which the filter is attached. The valve 15 will remain closed until the pressure is sufficient to overcome the combined attractive force of the magnet 26 to seat ring 32 plus the light spring 46. When the pressure level in area 45 becomes sufficient, disc 23 will leave seat 32, and the valve will open considerably as illustrated in FIG. 3 to permit the fluid to continue flowing between inlets 11 and 12 and outlet 13. As disc 23 leaves seat 32, the lip 31 will be tripped free of pin 33, and the valve disc 23 and magnet 26 along with plate 27 will be rotated clockwise as indicated by the arrow in FIG. 9 under the bias of spring 29. Rotation is limited by lip 30 striking the arm 22 as viewed in FIG. 9. The degree of rotation is predetermined to agree with the amount of rotation desired of the indicator. In the cocked position of the valve the indicator unit 39 will be held by magnet 40 in such a manner as to indicate "normal" through windows 37 of face plate 36. As magnet 26 associated with the valve 23 rotates, when the valve is tripped under fluid pressure, the magnet 40 will follow or rotate to the same degree due to interaction of the lines of force between the two magnets, and the indicator plate 41 will be moved to a "by-pass" indication. If the pressure should drop for any reason permitting valve 23 to be reseated, it will be obvious that the valve magnet must be rotated counter-clockwise manually in order to recock the mechanism. Until this is done, therefore, the indicator will indicate "by-pass" until the mechanism is reset, desirably after a filter cartridge change. As is indicated in FIGS. 5 and 7, the indicator plate 41 is provided with a projection 47 extending into a well 48 in casing 10 which limits the arcuate movement of the indicator to agree with the letter spacing of the indicator plate 41 and the windows 37.

Figure 10:
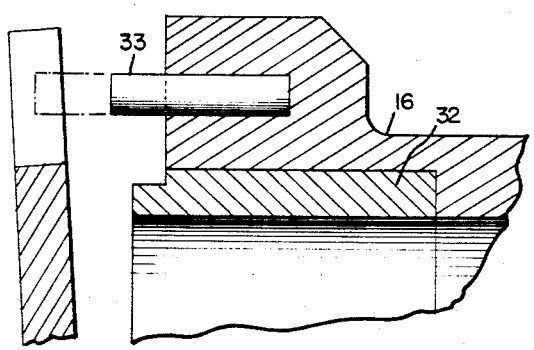
FIG. 10 is a fragmentary detail of a portion of the valve and the valve seat, illustrating in dotted lines how the stop pin length may be varied to obtain a range of sensitivity.

In order to set the sensitivity of operation of the by-pass valve and indicator the length of the pin 33 may be varied as is indicated by dotted lines in FIG. 10. As is illustrated in solid lines, the portion of the pin 33 extending past the plane of the seat is quite short. With the valve seated it is quite obvious that a very small counterclockwise movement of the valve about pin 20 will cause lip 31 to clear the pin and the indicator to function. This sensitive condition may be decreasingly varied by extending the obstructing portion of the pin 33 as shown in dotted lines. Under such a condition it is obvious that more than a slight unseating of the valve during operation would be required to cause a function of the indicator.

Figure 11:
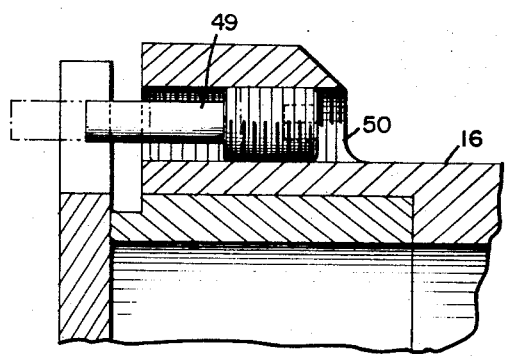
FIG. 11 is a fragmentary detail similar to FIG. 10 but illustrating a modified form of stop pin which is adjustable to obtain a range of sensitivity.

FIG. 11 illustrates a modified form of stop pin 49 which is adjustably positioned in the threaded bore 50 of valve seat portion 16. Sensitivity is readily adjustable to suit the demand of the use to which the filter is put.

Figure 12:
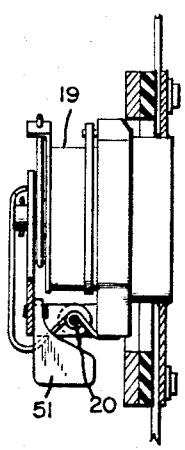
FIG. 12 is a view in side elevation of a modified form of the by-pass valve of the invention wherein the valve is weighted in such a manner as to substantially place the center of gravity in the pivot pin for the valve.

At times such, as in aircraft, violent vibrations occur which may tend to unseat a pivoted valve member. In FIG. 12 the valve 19 is provided with a weight 51 which is so constructed and positioned as to substantially place the center of gravity of the valve in the pivot pin 20. With this arrangement force moments attributable to vibration and shock are minimized and the valve unseating becomes responsive only to pressure in the filter.

Figure 13:
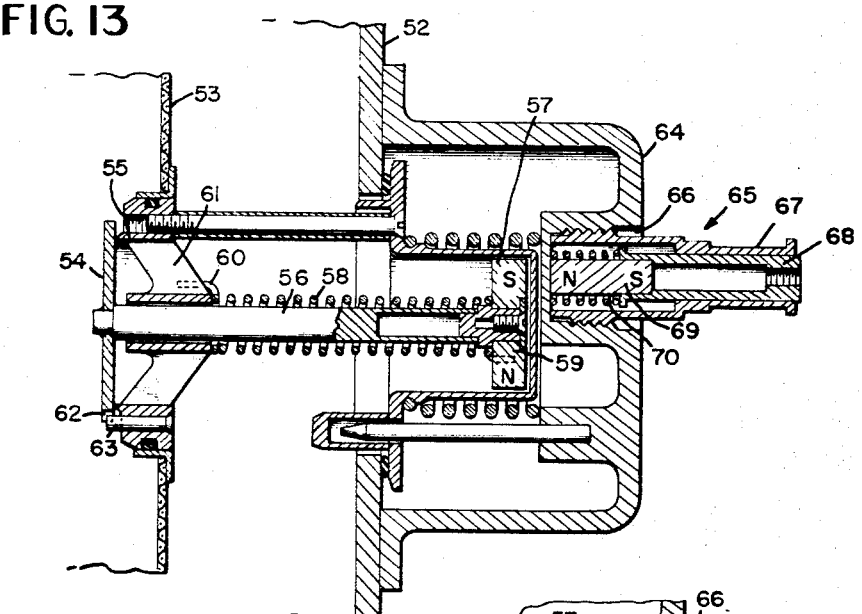
FIG. 13 is a fragmentary, sectioned view in side elevation illustrating a portion of a filter with the principles of the invention applied to a reciprocating valve.
Figure 14:
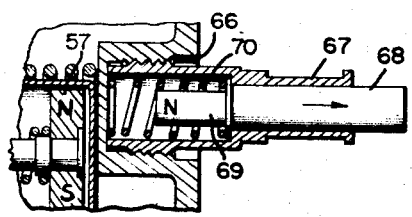
FIG. 14 is a detail of the indicator mechanism of FIG. 13 in operated condition.

Referring now to FIG. 13 the basic concept of the invention is illustrated as being applied to a reciprocating by-pass valve. Thus a filter 52 including a cartridge 53 has associated therewith a reciprocating by-pass valve 54. The valve which is illustrated as closed against seat 55 is carried by a stem 56. Affixed to the opposite end of stem 56 is a permanent magnet 57. Positioned about stem 56 is a torsion spring 58 which is affixed at one end 59 to magnet 57 and at the other end 60 to one supporting strut 61 of seat 55. In use the valve 54 is biased toward seat 55 by the spring 58. In order for the valve to fully seat, however, the spring 58 must be wound sufficiently for a notch 62 in valve 54 to align with a stop pin 63 extending outwardly of the seat as in the other forms of the invention.

The magnet portion of the by-pass valve arrangement is illustrated in FIG. 13 as extending through the side wall of filter casing 52 into an area housed by a combination cover and indicator mount 64. The mount 64 is provided with a spring actuated, magnet controlled indicator assembly 65 which is shown threaded into a recess 66 in the mount. The assembly 65 includes a cylinder member 67 within which is mounted a sliding piston 68 to which is attached a magnet 69. By means of the arrangement, magnet 69 may be positioned quite close to magnet 57. With these two magnets poled as indicated and with the valve 54 closed, the piston 68, which is the clogged filter indicator, is restrained from moving. If the cartridge 53 becomes clogged and valve 54 is moved to the left beyond the end of pin 63, then spring 58 will rotate the valve including its stem and magnet 57 so that the north pole of magnet 57 will move opposite the north pole of magnet 69 with the result that magnet 69 will be repelled and will with spring 70 project the piston indicator 68 outwardly from cylinder 67. With this arrangement it is obvious that valve 54 must be rewound and cocked on pin 63 before a non-clogged condition can be re-established for the indicator. This operation of course is accomplished during a cartridge change.

Figure 15:
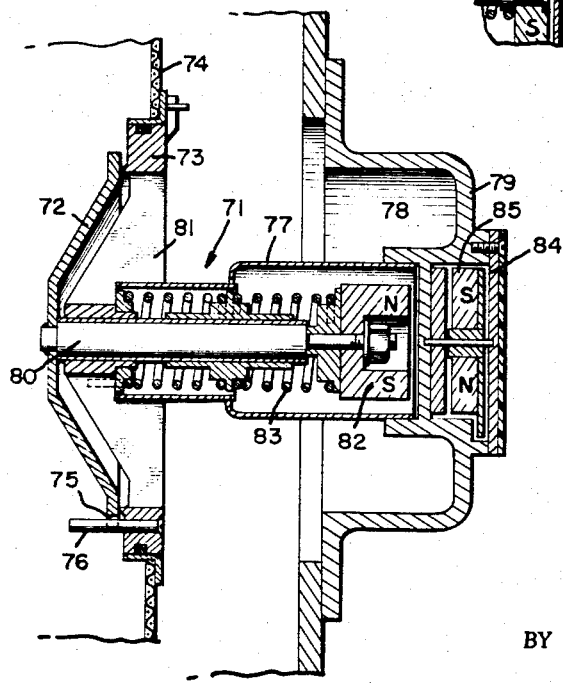
FIG. 15 is a view similar to FIG. 13 but illustrating a rotary indicator associated with the reciprocating valve.

In FIG. 15 a form of the invention is illustrated in which the indicator of FIG. 4 is adaptable to operation with a reciprocating by-pass valve. In this form a valve assembly 71 includes a valve 72 shown closed against seat 73 carried by filter cartridge 74. As in the form of FIG. 13, valve 72 is provided with a notch 75 to provide for cocking cooperation with a stop pin 76 extending from seat 73. The assembly 71 includes a generally tubular mounting member 77 which itself is supported by an inwardly projecting boss 78 of combination cover and indicator mount member 79. The valve 72 is carried on one end of a valve stem 80 which is rotatably supported by seat spider 81 and which extends through tubular member 77. On the end of stem 80 in proximity to boss 78 is affixed a U-shaped permanent magnet 82. Secured at one end to magnet 82 and at the other end to stationary supporting structure is a coil spring 83. As in the form of the invention in FIG. 13, the spring biases the valve toward a closed condition, and will close the valve if the notch 75 of valve 72 is aligned with pin 76. In order to so align the parts however the spring must be rotated. In doing so the magnet 82 will be set in a given angular attitude about the axis of the valve stem 80. In the exterior recess 84 of boss 78 is provided a follower magnet 85 of the same construction and operating characteristics as the magnet and indicator mechanism of the other embodiments illustrated in FIGS. 1 through 9. In operation under clogged filter conditions, the valve 72 unseats sufficiently to clear pin 76 at which time the valve 72, stem 80 and magnet 82 will rotate under the influence of spring 83 and magnet 85, being oppositely poled and so attracted to magnet 82 will follow the angular movement to change the indicator to indicate the clogged condition.

While the combination magnetic valve and valve condition indicator has been illustrated and described with specific relation to a filter, it should be quite obvious to one skilled in the art of fluid systems, that the invention will be readily adaptable to fluid lines generally where it may be desirable to now the condition or position of a valve inserted therein.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended ot be embraced therein.

What is claimed and desired to be secured by United States Letters Patent is:

1. In combination: a housing; valve means including a valve seat within said housing and a movable valve member mounted for closing and opening movement relative to said valve seat; magnetic field responsive indicator means for indicating the position of said valve member relative to said valve seat; first magnetic means having poles of opposite polarity closely adjacent to said indicator means and drivingly connected to said movable valve member for movement proportional to the opening movement of said valve member; said indicator means including second magnetic means having at least one pole closely adjacent to the pole of opposite polarity of said first magnetic means in its normal position corresponding to the closed position of said movable valve member and being mounted for movement relative to said first magnetic means to a second valve movement indicating position for actuation of said indicator means; said first magnetic means being movable during the opening movement of said movable valve member to position its other pole closely adjacent to said at least one pole of said second magnetic means for repelling said second magnetic means from its normal position to its second position for actuating said indicator means.

2. The device of claim 1, wherein said second magnetic means is mounted for reciprocation relative to said first magnetic means between said normal position and said valve movement indicating position.

References Cited

UNITED STATES PATENTS

| | | | |
|---|---|---|---|
| 2,076,935 | 4/1937 | Burckhalter | 210—132 |
| 2,669,707 | 2/1954 | Ehrman | 210—130 X |
| 2,773,601 | 12/1956 | Keller et al. | 210—130 |
| 3,029,836 | 4/1962 | Gruner | 210—90 X |
| 3,043,262 | 7/1962 | Gruner | 210—90 X |
| 3,077,854 | 2/1963 | Pall | 210—90 X |
| 3,128,743 | 4/1964 | Whiting | 210—90 |

SAMIH N. ZAHARNA, *Primary Examiner.*

U.S. Cl. X.R.

116—70; 210—130